United States Patent
Sa et al.

(10) Patent No.: US 7,443,472 B2
(45) Date of Patent: Oct. 28, 2008

(54) LIQUID CRYSTAL DISPLAY DEVICE AND METHOD OF FABRICATING THE SAME

(75) Inventors: Un Nyoung Sa, Gyeonggi-do (KR); Joung Won Woo, Gyeonggi-do (KR); Man Hoan Lee, Seoul (KR); Hyung Ki Hong, Seoul (KR)

(73) Assignee: LG DIsplay Co., Ltd., Seoul (KR)

( * ) Notice: Subject to any disclaimer, the term of this patent is extended or adjusted under 35 U.S.C. 154(b) by 0 days.

(21) Appl. No.: 10/673,145

(22) Filed: Sep. 30, 2003

(65) Prior Publication Data

US 2004/0085500 A1 May 6, 2004

(30) Foreign Application Priority Data

Oct. 31, 2002 (KR) ...................... 10-2002-0066787

(51) Int. Cl.
*G02F 1/1335* (2006.01)
(52) U.S. Cl. .................. 349/117; 349/43; 349/106; 349/118; 349/119
(58) Field of Classification Search .................. 349/43, 349/106, 117–121, 113, 138
See application file for complete search history.

(56) References Cited

U.S. PATENT DOCUMENTS

| 5,499,126 | A | * | 3/1996 | Abileah et al. | ............... 349/106 |
|---|---|---|---|---|---|
| 5,926,242 | A | * | 7/1999 | Kataoka et al. | ............. 349/117 |
| 6,016,178 | A | * | 1/2000 | Kataoka et al. | ............. 349/117 |
| 6,320,629 | B1 | * | 11/2001 | Hatano et al. | ................. 349/15 |
| 6,359,672 | B2 | * | 3/2002 | Gu et al. | ..................... 349/138 |
| 6,384,878 | B1 | * | 5/2002 | Kwak | ........................... 349/40 |
| 6,582,862 | B1 | * | 6/2003 | Nakamura et al. | ............. 430/7 |
| 6,621,543 | B2 | * | 9/2003 | Moon | ......................... 349/115 |
| 6,621,550 | B1 | * | 9/2003 | Arakawa et al. | ............ 349/178 |
| 6,707,067 | B2 | * | 3/2004 | Zhong et al. | .................. 257/59 |
| 2002/0140888 | A1 | * | 10/2002 | Nishiyama et al. | .......... 349/117 |
| 2003/0086041 | A1 | * | 5/2003 | Watanabe et al. | ........... 349/122 |
| 2003/0122984 | A1 | * | 7/2003 | Song et al. | ..................... 349/43 |
| 2004/0090566 | A1 | * | 5/2004 | Jung et al. | ..................... 349/43 |

\* cited by examiner

*Primary Examiner*—David C. Nelms
*Assistant Examiner*—Thanh-Nhan P Nguyen
(74) *Attorney, Agent, or Firm*—Morgan Lewis & Bockius LLP

(57) ABSTRACT

A liquid crystal display device includes a transparent insulating substrate, a gate line and a gate electrode on the transparent insulating substrate, a gate insulating film, an active layer, an ohmic contact layer, source and drain electrodes, and a data line on the transparent insulating substrate, a passivation film formed on the transparent insulating substrate including the source and drain electrodes and the data line, a compensation film formed on the passivation film, and a pixel electrode formed on at least the compensation film.

5 Claims, 6 Drawing Sheets

LIQUID CRYSTAL DISPLAY DEVICE AND METHOD OF FABRICATING THE SAME

The present invention claims the benefit of Korean Patent Application No. 66787/2002 filed in Korea on Oct. 31, 2002, which is hereby incorporated by reference.

BACKGROUND OF THE INVENTION

1. Field of the Invention

The present invention relates to a display device, and more particularly, to a liquid crystal display device having a reduced profile and a method of fabricating the same.

2. Description of the Related Art

In general, a liquid crystal display (LCD) device includes a first substrate, a second substrate, a liquid crystal material disposed between the first substrate and the second substrate, wherein one of the first and second substrates is a thin film transistor substrate (TFT substrate) and the other is a color filter substrate. In addition, the LCD device includes a backlight assembly disposed at a lower portion of an LCD panel to irradiate light.

The TFT substrate commonly includes gate bus lines and data bus lines that are formed on an inner surface of the transparent substrate in a matrix configuration. Thin film transistors (TFTs) function as switching devices and are formed at intersections between the gate bus lines and the data bus lines, and pixel electrodes are formed in unit pixel region contacting with drain electrodes of the TFTs.

The color filter substrate commonly includes a transparent substrate, a black matrix (BM) formed on an inner surface of the transparent substrate, a color filter layer, and a common electrode. The liquid crystal material is interposed between the color filter substrate and the TFT substrate.

During operation of the LCD device, a driving circuit supplies a voltage to the gate bus lines and the data bus lines. As the voltage is supplied to the gate bus lines, the TFTs disposed at the intersections between the gate lines and the data lines to which the voltage is supplied, are turned ON or OFF. Then, charges are accumulated in the pixel electrodes connected with the drains of the turned-ON TFTs and a voltage supplied to the common electrode induce an electric field to the liquid crystal material. Accordingly, orientation of liquid crystal molecules of the liquid crystal material are changed in each unit pixel region. Thus, transmission characteristics of the liquid crystal material are changed such that light is permitted or prevented from traversing through the liquid crystal material and color filter, thereby producing a colored image.

FIG. 1 is a cross sectional view of a TFT substrate according to the related art. In FIG. 1, a gate electrode 102 is formed on a transparent substrate 101, and a gate insulating film 103 is grown on the gate electrode 102 by a plasma enhanced chemical vapor deposition (PECVD). Next, an amorphous silicon layer and an phosphorous-doped amorphous silicon layer are sequentially deposited and patterned using photolithographic processes to form a channel layer 104 that includes an active layer 104a and an ohmic contact layer 104b.

Next, a metal layer is deposited on the substrate including the channel layer 104, and is patterned by photolithographic processes to form source/drain electrodes 105 and 110 that contact the ohmic contact layer 104b. Then, a passivation film 106 of an inorganic material is formed on the substrate, and a pixel electrode 107 is formed on the passivation film 106. The pixel electrode 107 includes indium tin oxide (ITO).

FIG. 2 is a cross sectional view of a color filter substrate according to the related art, wherein a color filter layer of a color filter substrate is formed by a pigment dispersion method. In FIG. 2, a photoresist film containing carbon black and titanium oxide, which have a light-shielding property, is coated on a transparent insulating substrate 201. Portions of the photoresist film are exposed to light using a mask to form a predetermined pattern. Then, the photoresist film is developed to remove the exposed portions of the photoresist film. Accordingly, remaining portions of the photoresist film are pattern after the completion of the developing process, and are hardened to form the black matrix 202.

Then, a photoresist film of azo-based red pigment is coated on the substrate upon which the black matrix 202 has been previously formed, and portions of the photoresist film are exposed to light using a mask to form a predetermined pattern. Next, the photoresist film is developed to remove the exposed portions of the photoresist film, and remaining portions of the photoresist film are hardened to form a red color filter. Using the same method as the formation of the red color filter, a green color filter and a blue color filter are sequentially formed on the substrate, thereby completely forming a color filter layer 203.

Next, a transparent conductive film, such as ITO, is deposited on an entire surface of the substrate to form a common electrode 204. The color filter substrate and the TFT substrate are bonded to each other while maintaining a predetermined gap by using spacers. The liquid crystal material is injected into the gap between the bonded substrates, thereby fabricating a liquid crystal display module.

Meanwhile, the injected liquid crystal material includes liquid crystal molecules that have a birefringence, wherein a refractive index of a long axis of the liquid crystal molecules is different from a short axis of the liquid crystal molecules. Due to this birefringence, viewing angles are changed according to a position of a viewer since a polarization state of linearly polarized light changes when the light passes through the crystal liquid material. Accordingly, when the LCD is viewed from a front side or a lateral side, the amount of light and color characteristics of the displayed image are changed depending on the position of the viewer. Thus, viewing characteristics of the liquid crystal display device are changed including brightness, contrast ratio, color shift, and gray inversion.

One proposed solution to the adverse changes of the view characteristics includes use of phase compensation technology, wherein a phase difference film is used to reduce variations in phase differences with respect to variations of the viewing positions. For example, in FIGS. 1 and 2, compensation films 108 and 205 are further formed to compensate the phase difference due to the liquid crystal material. Specifically, the compensation film 108 is arranged on the lower surface of the transparent substrate 101 of the TFT substrate, and the compensation film 205 is arranged on the lower surface of the transparent substrate 201 of the color filter substrate. Accordingly, the compensation films 108 and 205 compensate the phase variations in the liquid crystal material in opposite directions to the phase variations, wherein uniaxial or biaxial films are used as the compensation films 108 and 205.

However, foreign particles may be interposed between the compensation films 108 and 205 and the color filter and/or TFT substrates when the compensation films 108 and 205 are disposed on outer surfaces of the color filter and/or TFT substrates. Accordingly, the foreign particles complicate the fabricating process since the compensation films 108 and 205 must be removed, the foreign particles are cleaned from the substrates, and then the substrates are reattached to the outer surfaces of the substrates. Moreover, the compensation films 108 and 205 attached to the outer surfaces of the TFT substrate and the color filter substrate increase an overall thickness of the LCD device.

SUMMARY OF THE INVENTION

Accordingly, the present invention is directed to a liquid crystal display device and method of fabricating a liquid crystal display device that substantially obviate one or more problems due to limitations and disadvantages of the related art.

An object of the present invention is to provide a liquid crystal display device and method of fabricating a liquid crystal display device having a reduced profile.

Another object of the present invention is to provide a liquid crystal display device and method of fabricating a liquid crystal display device having simplified fabrication processes.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a transparent insulating substrate, a gate line and a gate electrode on the transparent insulating substrate, a gate insulating film, an active layer, an ohmic contact layer, source and drain electrodes, and a data line on the transparent insulating substrate, a passivation film formed on the transparent insulating substrate including the source and drain electrodes and the data line, a compensation film formed on the passivation film, and a pixel electrode formed on at least the compensation film.

In another aspect, a method of fabricating a liquid crystal display includes forming a black matrix on a transparent insulating substrate, forming a color filter layer on the black matrix, forming a compensation film on an upper surface of the color filter layer, and forming a common electrode on the compensation film.

In another aspect, a liquid crystal display device includes a thin film transistor substrate, a pixel electrode formed on the thin film transistor substrate, a color filter substrate, a common electrode formed on the color filter substrate, a liquid crystal material formed between the thin film transistor substrate and the color filter substrate, and a compensation film contacting at least one of the pixel electrode and the common electrode, wherein the compensation film compensates for phase variations of light transmitted through the liquid crystal material.

In another aspect, a liquid crystal display device includes a first substrate including a plurality of pixel electrodes, a second substrate including a common electrode, a color filter film, and a black matrix, a liquid crystal material formed between the first and second substrates, an overcoat film on the color filter film and the. black matrix, and a compensation film formed beneath the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the attached drawings.

Figure 1:
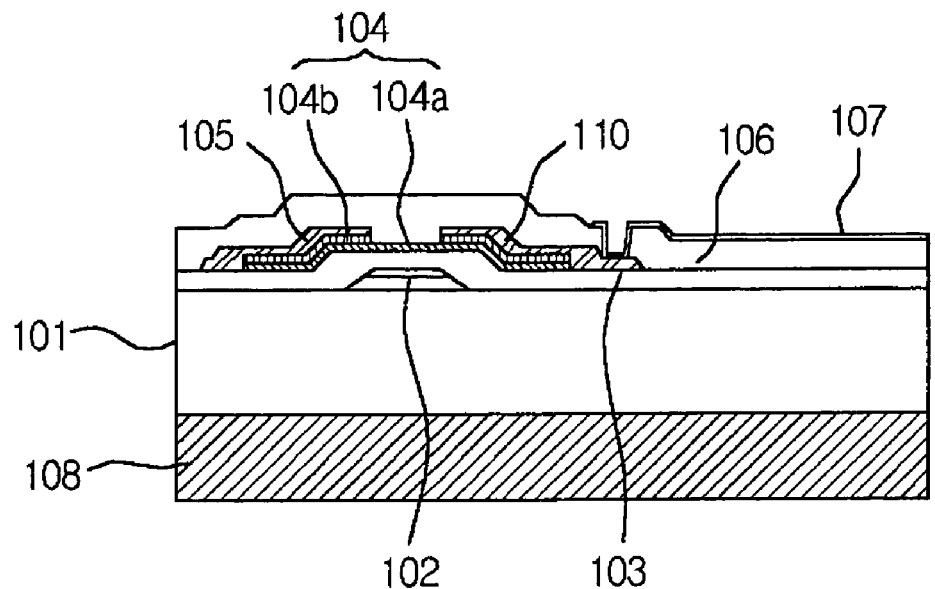
FIG. 1 is a cross sectional view of a TFT substrate according to the related art.
Figure 2:
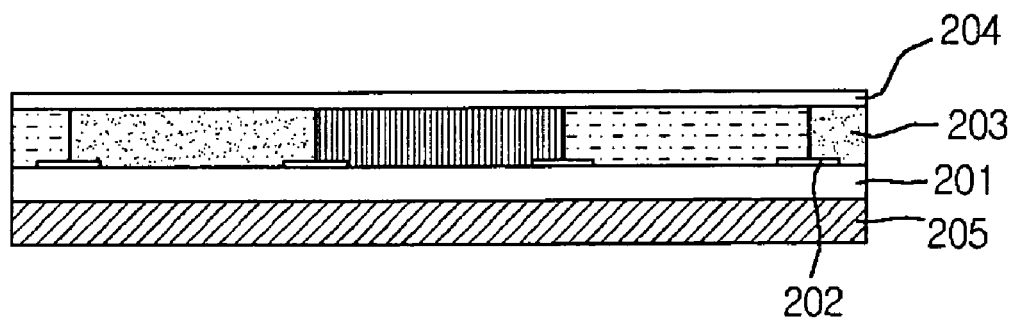
FIG. 2 is a cross sectional view of a color filter substrate according to the related art.
Figure 3:
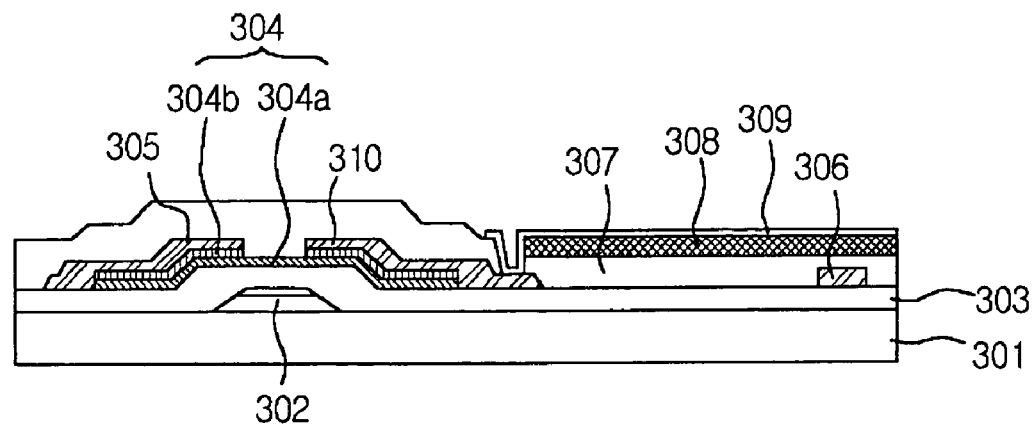
FIG. 3 is a cross sectional view of an exemplary TFT substrate according to the present invention.

FIG. 3 is a cross sectional view of an exemplary TFT substrate according to the present invention. In FIG. 3, a TFT substrate may include a transparent insulating substrate 301, a gate line (not shown) and a gate electrode 302 that may be formed by depositing a metal film on the transparent insulating film 301, a gate insulating film 303, an active layer 304a, an ohmic contact layer 304b, source and drain electrodes 305 and 310, and a data line 306. In addition, a passivation film 307 may be deposited on the source/drain electrodes 305 and 310 and the data line 306 to provide protection, a compensation film 308 may be formed on an upper surface of the passivation film 307, and an ITO pixel electrode 309 may be formed on the compensation film 308. The compensation film 308 may compensate for phase variations of light, thereby improving viewing angles of the liquid crystal display device.

Figure 4:
FIGS. 4 to 8 are cross sectional views of an exemplary method for fabricating a TFT substrate according to the present invention.

FIGS. 4 to 8 are cross sectional views of an exemplary method for fabricating a TFT substrate according to the present invention. In FIG. 4, a gate metal film may be deposited on a transparent insulating film 301 to form a gate line (not shown) and a gate electrode 302 that branches from the gate line.

Figure 5:
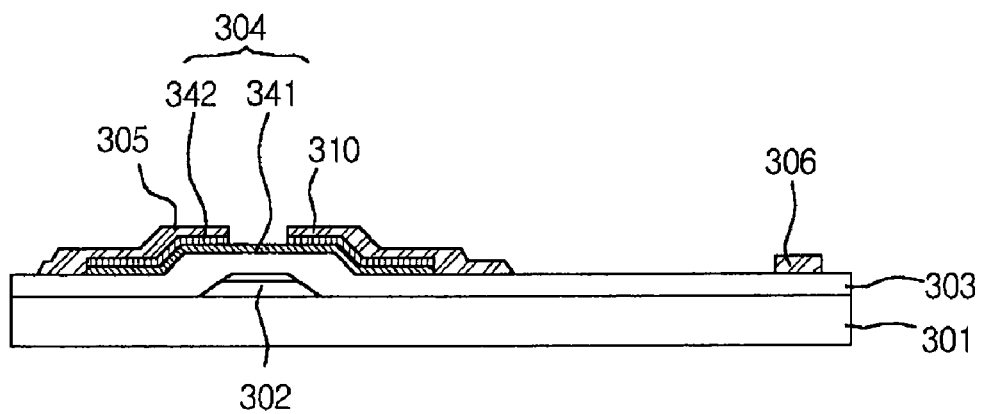

In FIG. 5, a gate insulating film 303, an active layer 341, an ohmic contact layer 342, source/drain electrodes 305 and 310, and a data line 306 may be sequentially formed on the TFT substrate including the gate line (not shown) and the gate electrode 302. The gate insulating film 303 may be deposited on the gate line (not shown) and the gate electrode 302 by a plasma enhanced chemical vapor deposition (PECVD). Then, an amorphous silicon layer and a phosphorous-doped amorphous silicon layer may be sequentially deposited on the gate insulating film 303. Next, the deposited amorphous silicon layer and phosphorous-doped amorphous silicon layer may be patterned using photolithographic processes, thereby forming a channel layer 304 of the active layer 341 between portions of the ohmic contact layers 342. Accordingly, the active layer 341 is formed of amorphous silicon and the ohmic contact layers 342 are formed of phosphorous-doped amorphous silicon.

Next, a metal film for source and drain electrodes may be formed on the TFT substrate including the channel layer 304 of the active layer 341 and the ohmic contact layers 342, and then patterned by photolithographic processes to form the source and drain electrodes 305 and 310 and the data line 306.

Figure 6:
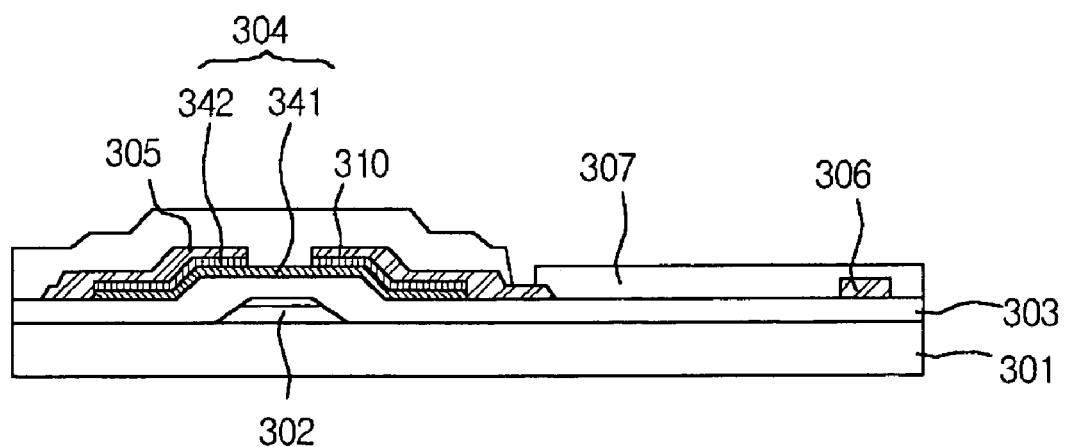

In FIG. 6, a passivation film 307 of an inorganic material may be deposited on an entire surface of the TFT substrate to protect a plurality of stacked devices. Then, a contact hole may be formed in the passivation film 307 to provide electrical contact between the drain electrode 310 and a subsequently formed pixel electrode within a pixel region of the passivation film 307. A process of forming the contact hole may include steps of coating a photoresist on the passivation film 307, forming a photoresist pattern using photolithographic processes, etching portions of the passivation film using the photoresist pattern as a mask, and removing the portions of the photoresist pattern.

Figure 7:
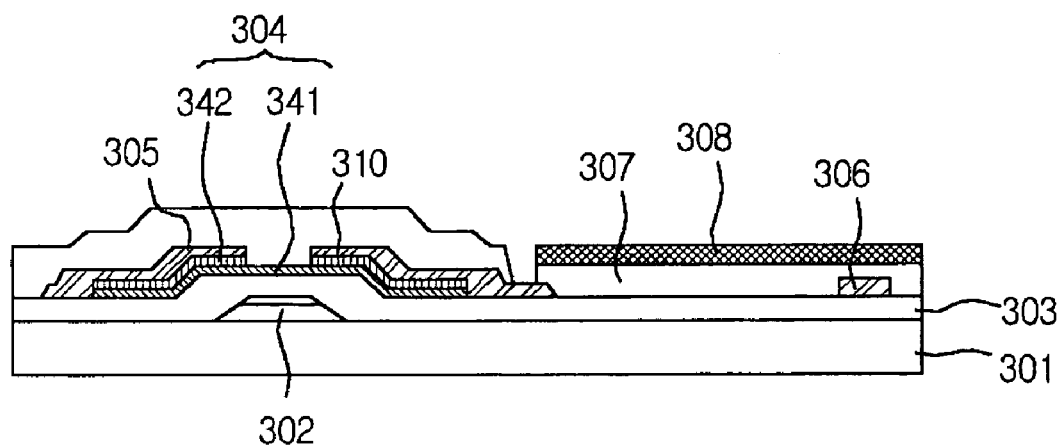

In FIG. 7, a step of forming a compensation film 308 at the subsequently formed pixel region on the passivation film 307 in which the contact hole may be formed. The compensation film 308 may not be formed during the previous step due to its chemical structure. Specifically, the processes performed prior to forming the compensation film 308 are carried out at high temperatures of 230° C. to 320° C. for an extended period of time, thereby decomposing polymers of the compensation film 308 and abruptly lower light transmittance of the liquid crystal display device. Accordingly, the compensation film 308 is formed prior to steps of forming the pixel electrode.

Figure 8:
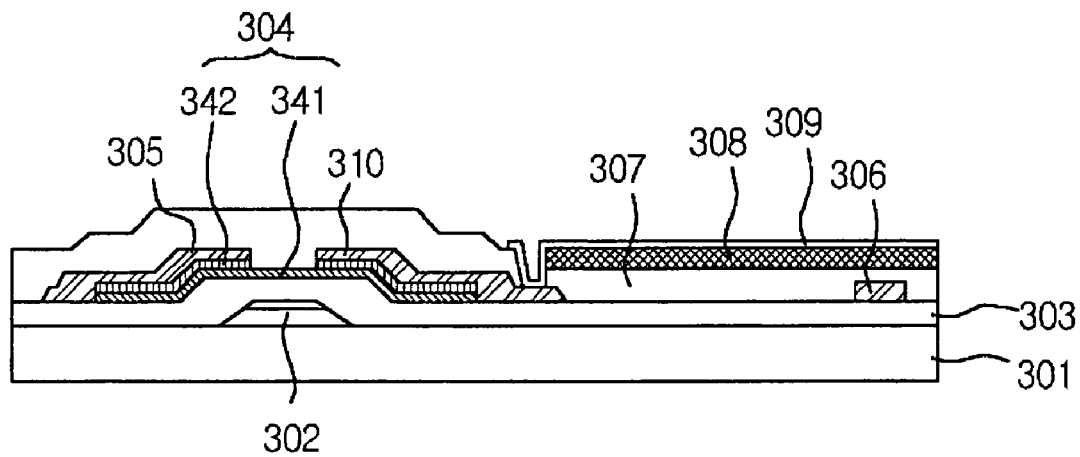

In FIG. 8, the pixel electrode 309, which may be formed of indium tin oxide (ITO), may be formed in the contact hole of the passivation film 307 and on the compensation film 308.

Figure 9:
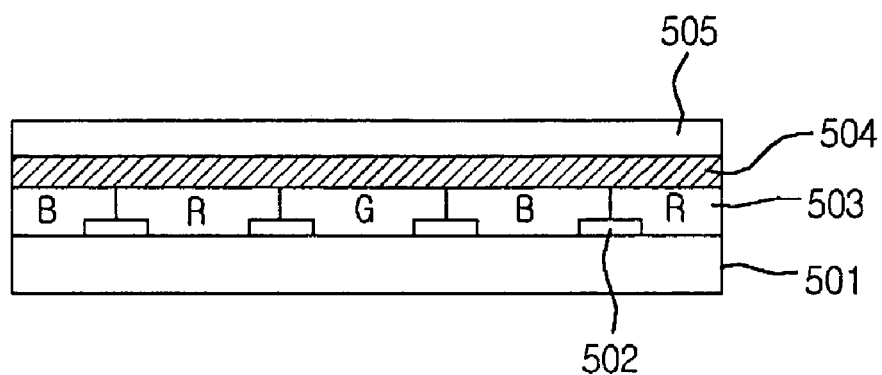
FIG. 9 is a cross sectional view of an exemplary color filter substrate according to the present invention.

FIG. 9 is a cross sectional view of an exemplary color filter substrate according to the present invention. In FIG. 9, a color filter substrate may include a transparent insulating substrate 501, a black matrix 502 formed by depositing a metal film of chromium (Cr) on the transparent insulating film 501, a color filter layer 503 formed by sequentially forming red, green, and blue color photoresist films on the black matrix 502 and exposing and developing the coated red, green, and blue photoresist films, a compensation film 504 formed on the color filter substrate upon which the color filter layer 503 has been previously formed, and a common electrode 505 formed by depositing a metal film of ITO on the color filter substrate upon which the compensation film 504 has been previously formed. The compensation film 504 may be formed on an upper surface of the color filter layer 503 to compensate for phase variations of light.

FIGS. 10 to 13 are cross sectional views of an exemplary method for fabricating a color filter substrate according the present invention. In FIGS. 10 to 13, a color filter layer may be formed by different methods that include dyeing, dye dispersion, pigment dispersion, and electrode-position. Accordingly, in FIGS. 10 to 13, the exemplary method includes the pigment dispersion method.

Figure 10:
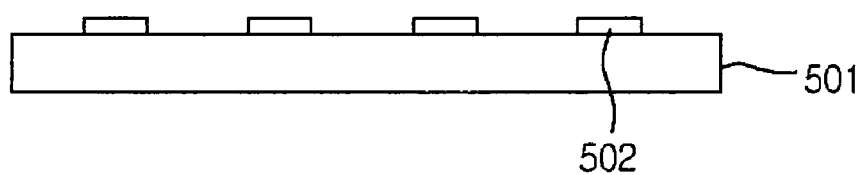
FIGS. 10 to 13 are cross sectional views of an exemplary method for fabricating a color filter substrate according the present invention.

In FIG. 10, a step of forming a black matrix (BM) 502 includes depositing a metal film of chromium on a transparent insulating substrate 501. Alternatively, another method may include depositing a photoresist film containing carbon black and titanium oxide, which have light-shielding properties, on the transparent insulating substrate 501. Then, portions of the photoresist film may be exposed to light using a mask to form a predetermined photoresist pattern. Then, the photoresist film may be developed to remove the exposed portions of the photoresist film, wherein remaining portions of the photoresist film pattern after the developing process may be hardened to form the black matrix 502.

Figure 11:
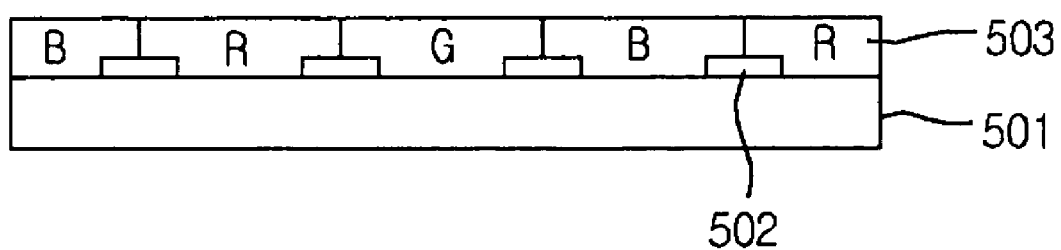

In FIG. 11, a red photoresist film may be coated on the black matrix 502, exposed to light, and developed to form a red color filter layer. For example, a photoresist film of azo-based red pigment may be coated on the transparent insulating substrate 501 upon which the black matrix (BM) 502 has been previously formed, and portions of the photoresist film may be exposed to light using a mask to form a predetermined photoresist pattern. Then, the photoresist film may be developed to remove the exposed portions of the photoresist film, wherein portions of photoresist film may be hardened to form a red color filter layer. Using the same method, green and blue color filter layers may be sequentially formed on the transparent insulating substrate 501. In addition, the green color filter layer and the blue color filter layer may be formed from phthalocyanine-based green pigment and phthalocyanine-based blue pigment, respectively. Thus, the color filter layer 503 may be formed.

Figure 12:
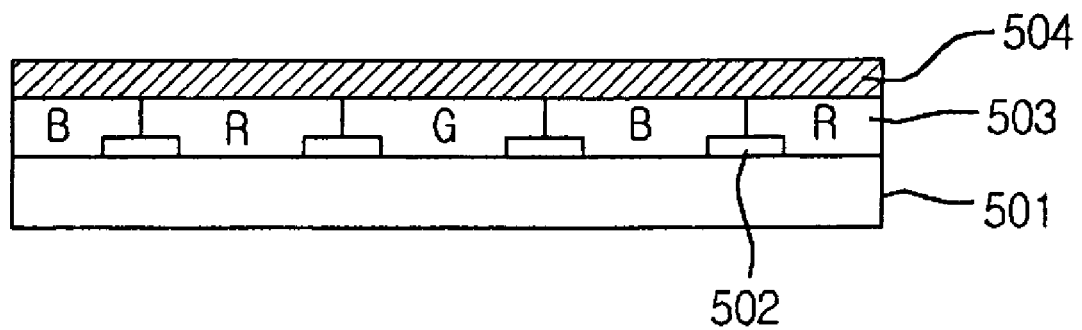

FIG. 12 shows a step of forming a compensation film 504 on the transparent insulating substrate 501 upon which the red, green, and blue color filter layers 503 have been previously formed. However, the compensation film 504 may not be formed in during previous steps due to its chemical structure. Specifically, the processes prior to forming the compensation film 504 may be performed at high temperatures of 230° C. to 320° C. for an extended period of time. Accordingly, polymers of the compensation film 504 may decomposed, thereby abruptly lowering light transmittance of the liquid crystal display device. Accordingly, the compensation film 504 may be formed prior to steps of forming a common electrode 505 (in FIG. 13).

Figure 13:
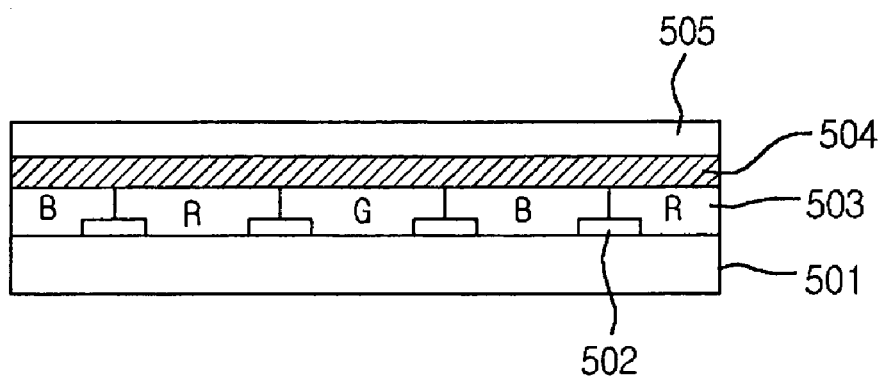

In FIG. 13, a step of forming the common electrode 505 on the transparent insulating substrate 501 upon which the compensation film 504 has been previously formed may include depositing an ITO metal film, which is a transparent conductive film, on an entire surface of the transparent insulating substrate 501.

Figure 14:
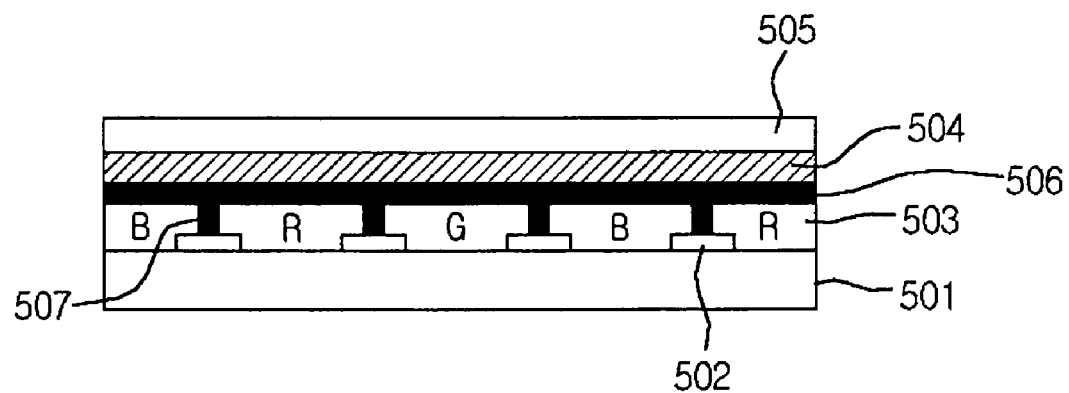
FIG. 14 is a cross sectional view of another exemplary color filter substrate according to the present invention.

FIG. 14 is a cross sectional view of another exemplary color filter substrate according to the present invention. In FIG. 14, a color filter substrate, as compared to the color filter substrate of FIG. 9, may further include an overcoat film 506 formed on the red, green, and blue color filter layers 503. The overcoat film 506 may be used to planarize a stepped portion 507 that may be formed when the color filter layer 503 is formed on the black matrix 502. However, the stepped portion 507 may not always be formed. Accordingly, the step of forming the overcoat film 506 may be omitted if planarization is not necessary. In addition, adhesion between the color filter layer 503 and the compensation film 504 may be enhanced, since the color filter layer 503 may be planarized by formation of the overcoat film 506.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a thin film transistor substrate;
   a pixel electrode formed on the thin film transistor substrate;
   a color filter substrate including a black matrix;

a common electrode formed on the color filter substrate;

a liquid crystal material formed between the thin film transistor substrate and the color filter substrate; and a compensation film at least disposed between the pixel electrode and the thin film transistor substrate to contact the pixel electrode within a pixel region, wherein the compensation film compensates for phase variations of light transmitted through the liquid crystal material and is only located under the pixel electrode, and wherein the compensation film is formed with a single uniform layer.

2. The device according to claim 1, further comprising an overcoat film formed between the compensation film and a color filter film on the color filter substrate.

3. The device according to claim 2, wherein the overcoat film is formed between red, green, and blue color filter layers of the color filter film.

4. The device according to claim 3, wherein the overcoat film contacts the black matrix formed between the red, green, and blue color filter layers.

5. The device according to claim 3, wherein the overcoat film contacts the red, green, and blue color filter layers.

* * * * *